(12) United States Patent
Larsson et al.

(10) Patent No.: US 6,201,811 B1
(45) Date of Patent: Mar. 13, 2001

(54) TRANSFERRING IDENTIFIER INFORMATION IN A TELECOMMUNICATIONS SYSTEM

(75) Inventors: Mikael Larsson, Domer Park; Peter Larsson, Euro Asia View, both of (SG)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/046,652

(22) Filed: Mar. 24, 1998

(51) Int. Cl.[7] .................................................. H04L 12/28
(52) U.S. Cl. ..................... 370/395; 714/774; 371/41; 370/280; 370/346; 370/328; 370/338; 370/397
(58) Field of Search ..................... 370/395, 397, 370/321, 337, 328, 280, 474, 399, 346, 401, 402, 338, 469; 714/774; 713/151; 380/247, 249; 455/425, 427, 426, 428, 430; 371/41

(56) References Cited

U.S. PATENT DOCUMENTS

| | | | |
|---|---|---|---|
| 5,408,469 | * 4/1995 | Opher et al. | 370/60.1 |
| 5,461,627 | * 10/1995 | Rypinski | 370/95.2 |
| 5,600,653 | * 2/1997 | Chitre et al. | 370/474 |
| 5,640,395 | * 6/1997 | Hamalainen et al. | 370/322 |
| 5,642,421 | 6/1997 | Gray et al. | 380/49 |
| 5,684,791 | 11/1997 | Raychaudhuri et al. | 370/278 |
| 5,699,369 | * 12/1997 | Guha | 371/41 |
| 5,812,545 | * 9/1998 | Liebowitz et al. | 370/337 |
| 5,828,677 | * 10/1998 | Sayeed et al. | 371/41 |
| 5,907,544 | * 5/1999 | Rypinski | 370/337 |
| 5,936,949 | * 8/1999 | Pasternak et al. | 370/328 |
| 6,088,337 | * 7/2000 | Eastmond et al. | 370/280 |

FOREIGN PATENT DOCUMENTS 0 660 570 A2   6/1995 (EP) ............................. H04L/29/06

OTHER PUBLICATIONS

"B–ISDN ATM Layer Specification, Integrated Services Digital Network (ISDN), Overall Network Aspects and Functions", ITU–T I.361, Nov. 1995, pp. 1–29.

* cited by examiner

Primary Examiner—Dang Ton
Assistant Examiner—Anthony Ton
(74) Attorney, Agent, or Firm—Burns, Doane, Swecker & Mathis, L.L.P.

(57) ABSTRACT

In a wireless telecommunications network, transporting identification information, such as access point identifier (AP ID) and wireless terminal identifier (WT ID) information, in each uplink and each downlink protocol data unit (PDU) being transmitted between a sender and a receiver, without increasing bandwidth requirements. This is accomplished by modifying each PDU as a function of a first identification vector, prior to transmission, wherein the first identification vector reflects, for example, the AP ID and the corresponding WT ID. At the receiver, the PDU is re-modified as a function of a second identification vector, wherein the second identification vector reflects an expected AP ID and WT ID. If the receiver is the intended recipient of the PDU, the first and second identification vectors will be the same, and the process of re-modifying the PDU merely serves to restore the original value of the PDU. The receiver can detect whether the original value of the PDU has been restored through a data integrity check, for example, one which employs a cyclic redundancy code (CRC). The result can then be used to determine whether the receiver is, in fact, the intended receiver, and whether the receiver should decode the PDU or discard it.

39 Claims, 11 Drawing Sheets

TRANSFERRING IDENTIFIER INFORMATION IN A TELECOMMUNICATIONS SYSTEM

BACKGROUND

The present invention relates to the transportation of information between a transmission source and a receiving entity in a telecommunications and/or computer network. More particularly, the present invention relates to the transportation of a priori information such as sender and receiver information (e.g., access point and wireless terminal identifier information) in a multiple base station or multiple access, wireless asynchronous transfer method (ATM) system.

ATM is a standard telecommunications protocol as defined in B-ISDN ATM Layer Specification, ITU-T Recommendation 1.361, November 1995. It is based on the transmission of data in fixed size data cells, known as ATM cells. Typically, each ATM cell has a 48 octet payload and a five octet header. ATM is well known in the telecommunications art.

In a wireless ATM system, such as the wireless system 100 depicted in FIG. 1, telecommunications data is transported between an access point, e.g., access point 105, and a wireless terminal, e.g., wireless terminal 110, over a wireless interface, in accordance with the ATM protocol. Wireless systems can be characterized as being either mobile or non-mobile systems. If the wireless system is a non-mobile system, the wireless terminals are stationary or they are physically restricted to a general broadcast area associated with the access point. A wireless local area network (i.e., a wireless LAN) is an example of a non-mobile, wireless system, where the wireless terminals are computer terminals. A cordless telephone system is another example of a wireless system with restricted support for mobility, where the wireless terminals are, of course, cordless telephones. In contrast, a cellular telephone system is an example of a system that is mobile, where the wireless terminals are cellular telephones.

FIG. 2 illustrates the format of an exemplary medium access control (MAC) protocol in a wireless ATM/LAN system. This exemplary MAC protocol specifically defines a set of rules and conventions for implementing a TDMA-type strategy in a wireless ATM-based network. TDMA is an example of a multiple access strategy that permits several wireless terminals to share the same physical channel. One particular advantage provided by a MAC protocol is that under the guidance of the scheduler, bandwidth is distributed among the various ATM virtual circuit (i.e., VC) connections in accordance with a "traffic contract". As illustrated in FIG. 2, each MAC frame, for example, MAC frame N, includes a broadcast data field 205, a downlink data field 210, an uplink data field 215, and a random access channel (RACH) 220.

The downlink data field 210 comprises a number of downlink protocol data units, for example, DL LLC PDU 230. Each DL LLC PDU, in turn, comprises an ATM cell which includes an ATM cell payload as explained above, for example, ATM cell payload 225. User data being transported from an access point to one of several associated wireless terminals is contained in the ATM cell payload.

In contrast, the uplink data field 215 is reserved for transporting user data from one or more wireless terminals to a corresponding access point. Similar to the downlink data field 210, the uplink data field 215 comprises a number of uplink protocol data units, for example, UL LLC PDU 240. Accordingly, the user data being transported from a wireless terminal to an access point is contained in an ATM cell payload, such as ATM cell payload 235.

The RACH 220, like the downlink data field 210 and the uplink data field 215, comprises a number of RACH PDUs, for example, RACH PDU 242. Although the RACH 220 is technically part of the uplink data field 215, for clarity, it is illustrated in FIG. 2 as a separate entity. The RACH 220 is, more specifically, used for transporting control type information, such as control messages (e.g., control message 243), retransmission messages and capacity requests, from the one or more wireless terminals to the corresponding access point.

Each MAC frame also includes a broadcast data field 205, as previously stated. The primary purpose of the broadcast data field is to transport framing information from an access point to the one or more wireless terminals associated with that access point. To accomplish this purpose, the broadcast data field includes, among other things, an announcement list 245 and an assignment list 250. More particularly, the announcement list 245 identifies those wireless terminals that are scheduled to receive user data in the present MAC data frame. Whereas the assignment list 250 identifies those wireless terminals that have been allocated bandwidth in the uplink data field 215 so that they may transmit user data to the corresponding access point.

Generally, each access point and each wireless terminal are assigned an identifier or identification code. The access point identifier (i.e., AP ID) uniquely identifies a corresponding access point from each of the other access points in the wireless ATM network, or, if there are a significant number of access points in the network, then the AP ID may uniquely identify the corresponding access point from other access points proximately located with respect to the broadcast area of the corresponding access point. The wireless terminal identifier (i.e., WT ID) uniquely identifies a wireless terminal from all other wireless terminals associated with the same access point.

By uniquely identifying the access points and the wireless terminals with AP IDs and WT IDs respectively, unintentional cross-communication between the various access points and wireless terminals in the wireless network can be avoided. Unintentional cross-communication is illustrated in FIGS. 8A, 8B and 8C, where each "solid line" represents an intended communication channel and each "dashed line" represents an unintended cross-communication channel, and where the designation "T" represents transmit mode and the designation "R" represents receive mode. More specifically, FIG. 8A illustrates the unintentional cross-communication between an access point (e.g., access point AP1) and a wireless terminal that is associated with another access point (e.g., wireless terminal WT2). FIG. 8B illustrates the unintentional cross-communication between two access points (e.g., AP1 and AP2) and between two wireless terminals (e.g., WT1 and WT2). FIG. 8C illustrates the unintentional cross-communication between a wireless terminal (e.g., WT1) and an access point (e.g., AP2) to which the wireless terminal is not associated.

By employing AP IDs and WT IDs, a wireless terminal is able to distinguish a downlink transmission (i.e., a DL LLC PDU) associated with a corresponding access point from transmissions associated with either another access point or another wireless terminal. Consequently, a wireless terminal can discard a transmission which is received from an unintentional source. Likewise, an access point is able to distinguish an uplink transmission (i.e., a UL LLC PDU and/or a RACH PDU) associated with a corresponding wireless terminal from a transmission associated with another access point or a wireless terminal affiliated with another access point. Consequently, the access point can discard a transmission which is received from an unintentional source.

In accordance with the MAC protocol, there are two ways in which the AP ID and the WT ID are transmitted from a sender to a receiver in a wireless ATM network. For example, the AP ID may be transmitted once in the broadcast data field 205. Alternatively, the AP ID along with the appropriate WT ID is included in each DL LLC PDU in the downlink data field 210, and each UL LLC PDU in the uplink data field 215, in addition to transmitting the AP ID in the broadcast data field 205. By incorporating the AP ID and the WT ID in each DL LLC PDU and each UL LLC PDU, the integrity of the AP ID and the WT ID is better protected because, as one skilled in the art will readily understand, the AP ID and the WT IDs will be covered by the forward error correction (FEC) and cyclic redundancy code (CRC) computations that are typically performed on each PDU. Unfortunately, transmitting AP ID and WT ID information in each PDU results in the transmission of redundant information, which, in turn, decreases bandwidth utilization efficiency.

As bandwidth is an expensive resource, it would be desirable to transfer the AP ID and WT ID, or any other priori information such as a CID code or a sequence number, in such a way that the integrity of the information is preserved, but not at the expense of bandwidth efficiency. In other words, it would be desirable to obtain the added data integrity that is provided by incorporating the a priori information in each PDU, but without utilizing additional bandwidth.

SUMMARY OF THE INVENTION

It is an object of the present invention to ensure that a wireless terminal in a wireless ATM system receives and decodes only intended downlink transmissions.

It is another object of the present invention to ensure that an access point in a wireless ATM system receives and decodes only intended uplink transmissions.

It is yet another object of the present invention to transfer a priori information such as access point identifier information, wireless terminal identifier information as well as other types of a priori information including connection identifier codes and sequence numbers, from a sender to a receiver and, in doing so, enhance data integrity and transmission security without diminishing bandwidth efficiency.

It is still another object of the present invention to permit a wireless terminal and/or an access point to recognize when it has received an unintended data and/or message transmission and to subsequently discard that transmission.

It is still another object of the present invention to recognize and discard correctly received transmissions which are out of sequence.

In accordance with one aspect of the present invention, the foregoing and other objects are achieved by a method of transporting a PDU from a sender to an intended receiver in a telecommunications network. The method includes the steps of generating, at the sender, a PDU containing a data word; encoding the data word as a function of a first identification vector without increasing the bandwidth required to transport the PDU from the sender to the receiver; and transmitting a data frame that includes the PDU from the sender to a plurality of receivers. Furthermore, the first identification vector includes a priori identification information relating to the sender and the intended receiver.

In accordance with another aspect of the invention, the foregoing and other objects are achieved by a method for determining whether a receiver is an intended receiver of a PDU transmitted to the receiver from a sender in a telecommunications network. The method includes the step of receiving the PDU, wherein the PDU comprises a user data vector and a CRC vector, and wherein the user data vector and the CRC vector have been modified at the sender, without increasing the bandwidth required to transmit the PDU from the sender to the intended receiver, as a function of a first identification vector which contains identification information relating to the sender and the intended receiver. The method further includes the steps of re-modifying the user data vector and the CRC vector as a function of a second identification vector which contains identification information relating to the receiver and an expected sender; verifying the integrity of the PDU as a function of the re-modified user data vector and the re-modified CRC vector; and determining whether the receiver is the intended receiver based on the result of the PDU integrity verification.

In accordance with yet another aspect of the invention, the foregoing and other objects are achieved by a method for transporting a PDU from a sender to an intended receiver in a telecommunications network, wherein the PDU contains a user data vector. The method includes the steps of appending a first identification vector to the user data vector; generating a CRC vector based on the user data vector and the appended, first identification vector; and appending the CRC vector to the user data vector. The appended, first identification vector is then removed from the user data vector, and the PDU is transmitted, including the user data vector and the appended CRC vector.

In accordance with still another aspect of the invention, the foregoing and other objects are achieved by a method for determining whether a receiver is an intended receiver of a PDU transmitted from a sender, wherein the PDU comprises a user data vector and a CRC vector, and wherein the CRC vector was derived at the sender as a function of the user data vector and a first identification vector that was appended to the user data vector only for the purpose of deriving the CRC vector. The method includes the steps of generating, at the receiver, a CRC generator polynomial based on the CRC vector; appending a second identification vector to the user data vector; dividing the CRC generator polynomial into a data word comprising the user data vector and the appended, second identification vector and determining whether the receiver is the intended receiver based on the result of the division.

BRIEF DESCRIPTION OF THE DRAWINGS

The objects and advantages of the invention will be understood by reading the following detailed description in conjunction with the drawings in which.

DETAILED DESCRIPTION

Figure 1:
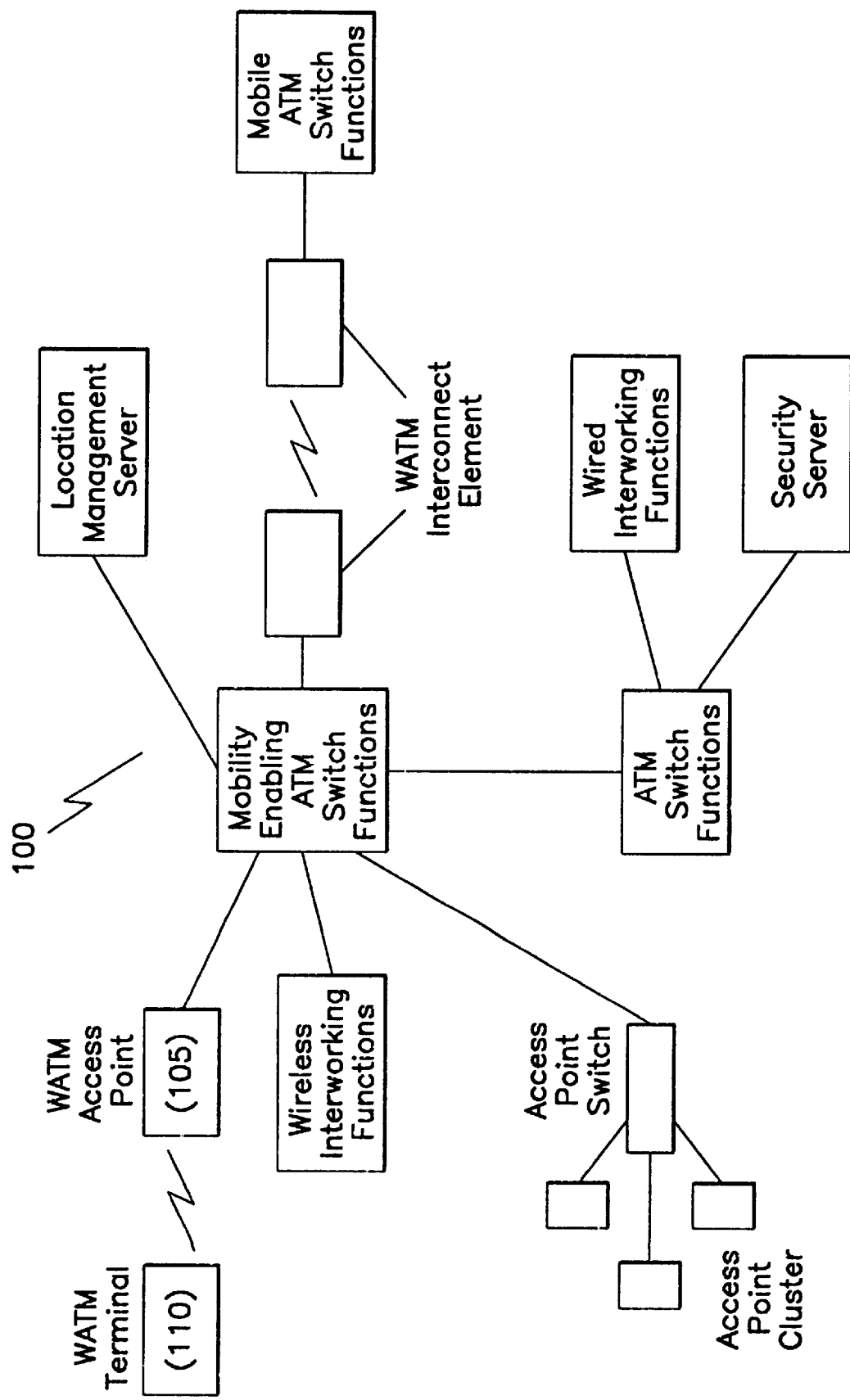
FIG. 1 is a diagram of an exemplary wireless ATM network.
Figure 2:
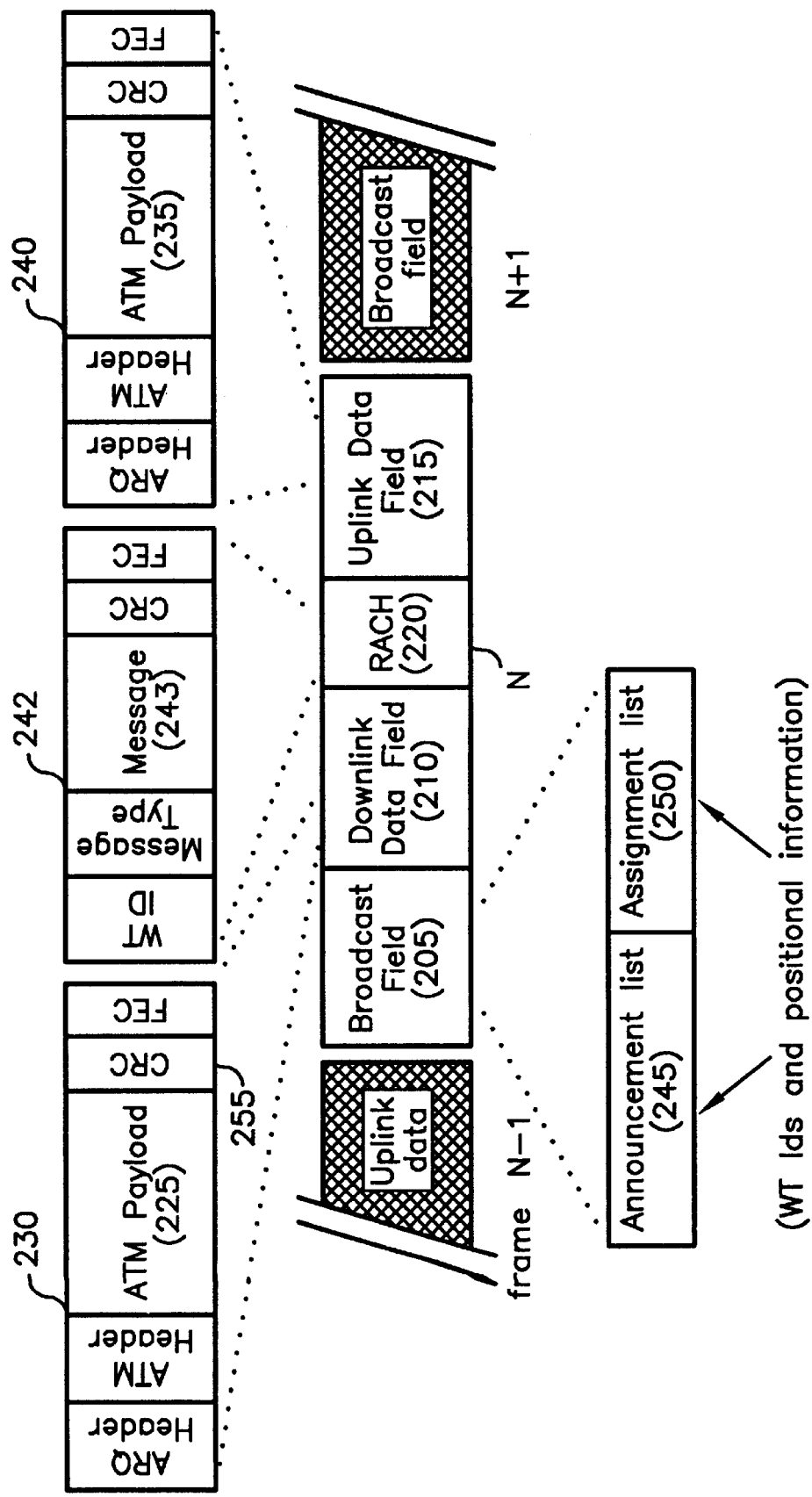
FIG. 2 illustrates an exemplary Medium Access Control protocol.

The present invention involves a bandwidth efficient technique for transporting a priori information such as sender and receiver identifier information in a wireless telecommunications network. For illustrative purposes, the various aspects and embodiments of the present invention are described herein below with respect to a wireless telecommunications network that employs the asynchronous transfer method (ATM), and, more particularly, a medium access control (MAC) protocol for ATM. However, it will be understood that the description of the present invention with respect to a wireless ATM network that employs a MAC protocol is not intended to limit the scope of the invention to such a network.

The present invention involves, more specifically, the transmission of a priori information such as access point identifier (i.e., AP ID) and wireless terminal identifier (i.e., WT ID) information in the broadcast data field of a MAC data frame and additionally, in each uplink logical link control packet data unit (UL LLC PDU), in each downlink logical link control packet data unit (DL LLC PDU), and in each random access channel packet data unit (RACH PDU). By including, for example, the AP ID and WT ID information in the uplink and downlink data fields, in addition to the broadcast data field, the integrity of the source and destination of the user data is significantly enhanced. However, in accordance with the various embodiments of the present invention described herein below, the priori information such as the AP ID and WT ID is incorporated into the uplink and downlink data fields without increasing bandwidth utilization.

In accordance with a first exemplary embodiment of the present invention, the AP ID and the WT ID information are incorporated into the downlink and uplink data fields by modifying, all or a portion of, each PDU, as a function of the AP ID and the WT ID prior to the transmission of the PDU. For example, the data vector in the ATM cell payload 225 and the CRC vector 255 may be modified (e.g., encoded) as a function of the AP ID and the corresponding WT ID, before the DL LLC PDU 230 is transmitted from the access point to the intended wireless terminal. Of course, each wireless terminal knows its own WT ID (i.e., the "expected" WT ID) as well as the AP ID of the corresponding access point (i.e., the "expected" AP ID). Therefore, any wireless terminal which receives the DL LLC PDU 230 can re-modify the ATM cell payload 225 and the CRC vector 255 as a function of the expected AP ID and the expected WT ID. If the wireless terminal is the intended recipient of the DL LLC PDU 230, the expected AP ID and WT ID applied by the wireless terminal should be the same as the AP ID and WT ID applied by the access point. A subsequent CRC check at the wireless terminal establishes whether the wireless terminal is, in fact, the intended recipient of the DL LLC PDU 230.

As one skilled in the art will readily appreciate, a CRC can be designed to exhibit certain desired characteristics. For example, the CRC can be designed to detect all single errors up to a limited number of arbitrarily permuted errors, where the limit is dependent upon the CRC generator polynomial. Additionally, the CRC may be designed to detect all constellations of odd errors (e.g., 3, 5, or 7 errors) or all error bursts shorter than the degree of the CRC generator polynomial. However, it will also be understood that an error burst vector with the length equal to the degree of the generator polynomial plus "1" has a likelihood of $2^{-(D(g)-1)}$ to remain undetected, wherein $D(g)$ is the degree of the generator polynomial. Furthermore, any error burst vectors with length longer than the degree of the generator polynomial plus "1" have a likelihood of $2^{-D(g)}$ to remain undetected.

Figure 3:
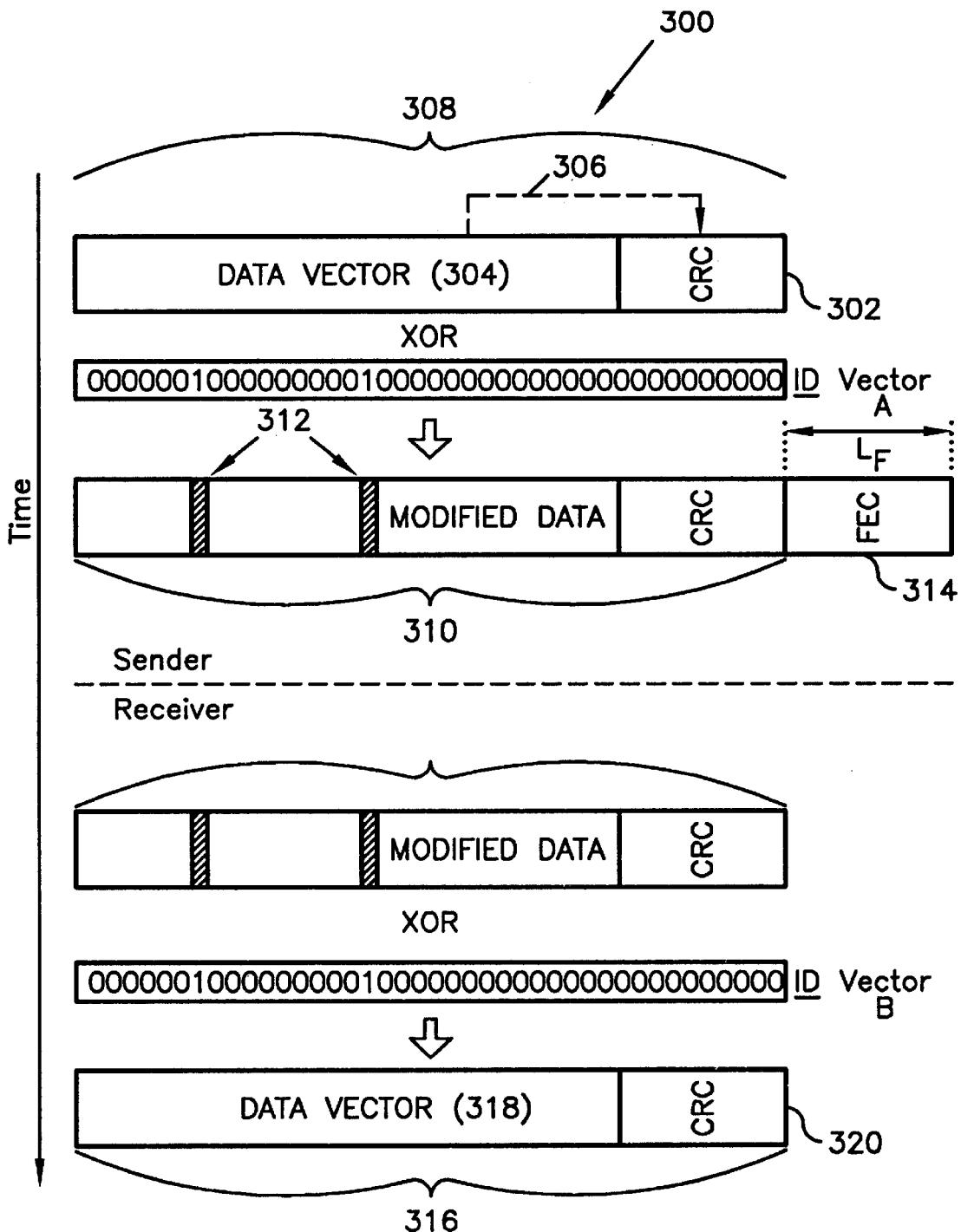
FIG. 3 illustrates a first embodiment of the present invention involving the transportation of sender and receiver identifier information.

FIG. 3 illustrates a general technique 300 for implementing the first exemplary embodiment described above, wherein sender and receiver identifier information (e.g., AP ID and WT ID information) are included in each PDU in the uplink and downlink data fields, in addition to the broadcast data field of a MAC data frame, without increasing bandwidth utilization. At the sender, a CRC vector 302 is derived from and appended to the data vector 304 as indicated by "dashed line" 306, thus forming the data/CRC vector 308. For illustrative purposes, the data vector 304 corresponds to the contents of the ATM cell payload in a PDU to be transmitted in the uplink or downlink data field. However, it will be readily understood that the data vector 304 could also include the ARQu header and the ATM cell header, if the data vector 304 is associated with a DL LLC PDU.

After the CRC vector 302 has been generated and appended as described above, an identification vector A (i.e., ID vector A) is applied to the data/CRC vector 308, as illustrated. ID vector A contains the sender identifier information and the intended receiver identifier information. For example, if the PDU which contains data/CRC vector 308 is a DL LLC PDU, the sender is an access point and the sender identifier information is the AP ID, whereas the intended receiver is one of the wireless terminals associated with the access point and the receiver identifier information is the WT ID. In contrast, if the PDU which contains data/CRC vector 308 is a UL LLC PDU, the sender is a wireless terminal and the sender identifier information is the corresponding WT ID, whereas the intended receiver is the access point and the receiver identifier information is the AP ID. As illustrated in FIG. 3, the application of ID vector A to the data/CRC vector 308 involves an exclusive "OR" (XOR) operation between ID vector A and the data/CRC vector 308. The XOR operation results in a modified data/CRC vector 310, where the modified data/CRC vector 310 differs from the data/CRC vector 308 by inverted bits 312.

The modified data/CRC vector 310 is then FEC encoded. The FEC vector 314 is then appended to the modified data/CRC vector 310. The PDU is now ready to be transmitted in either the uplink or downlink data field depending upon whether it is a UL LLC PDU or a DL LLC PDU.

At the receiver, FEC is performed on the modified data/CRC vector 310 (not shown) to correct any bit errors that may have occurred during the transmission of the PDU from the sender to the receiver, depending on the number and nature of the bit errors. To simplify the description of the technique illustrated in FIG. 3, it is assumed that no errors occurred during the transmission of the PDU.

Further in accordance with the technique 300 illustrated in FIG. 3, the receiver now determines whether it is, in fact, the intended recipient of the PDU. Accordingly, an identification code vector, herein referred to as ID vector B, is applied to the modified data/CRC vector 310. More specifically, the receiver performs an XOR operation between the ID vector B and the modified data/CRC vector 310. This produces a re-modified data/CRC vector 316, which consists of the data vector 318 and the CRC vector 320. If the receiver is the intended recipient of the PDU, the value of ID vector B should be equal to the value of ID vector A, and the XOR operation between ID vector B and the modified data/CRC vector 310 should result in the re-inversion of previously inverted data bits 312, as illustrated. The receiver then divides (using modulus-2 division) the re-modified data/CRC vector 316 by a CRC generator polynomial, which is a function of the CRC vector 320. If the remainder of that division is zero, the receiver is presumed to be the intended receiver.

Figure 4:
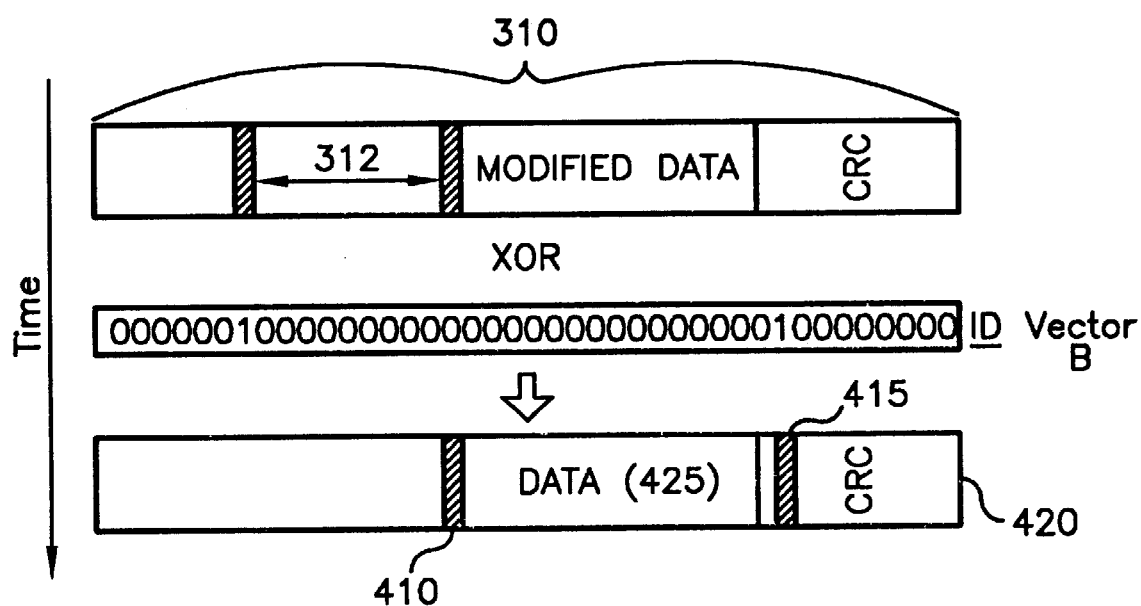
FIG. 4 illustrates the presence of bit errors induced in a received protocol data unit (PDU) when the receiver is not the intended receiver.

As stated, the value of ID vector B should be identical to the value of ID vector A, if the receiver is the intended recipient of the PDU. Accordingly, the XOR operation between ID vector B and modified data/CRC vector 310 results in the inversion of previously inverted data bits 312. Hence, the value associated with remodified data/CRC vector 316 is equivalent to the value associated with data/CRC vector 308. However, if the receiver is not the intended recipient of the PDU, as illustrated in FIG. 4, the ID vector B will differ from ID vector A. Consequently, the XOR operation between ID vector B and modified data/CRC vector 310 results in a data/CRC vector 405, which has a bit pattern that differs from the bit pattern associated with the re-modified data/CRC vector 316 in FIG. 3. In the example illustrated in FIG. 4, data/CRC vector 405 and remodified data/CRC vector 316 differ by the bits 410 and 415. Furthermore, the CRC generator polynomial, which is a generating function for the CRC vector 420, will not evenly divide the data/CRC vector 405. Since the division results in a non-zero value, the receiver knows that either the data vector 425 contains an uncorrectable error or the receiver is not the intended recipient of the PDU. The receiver can now discard the PDU to avoid the use of erroneous data and/or unintentionally received data.

In accordance with the embodiment described above, an XOR operation between the ID vector A and the data/CRC vector 308 is accomplished prior to the FEC operation. Therefore, the FEC encoding is performed on the modified data/CRC vector 310, rather than the data/CRC vector 308. However, in accordance with an alternative embodiment, error correction encoding is performed on the data/CRC vector 308 prior to the XOR operation. To avoid the possiblity that an error correction operation at an unintentional recipient might miscorrect intentionally induced errors, it is preferable, in this case, that the XOR operation at the sender induce more errors than the error correction code is able to correct, but less than the number of errors which the error correction code is able to detect.

Figure 9:
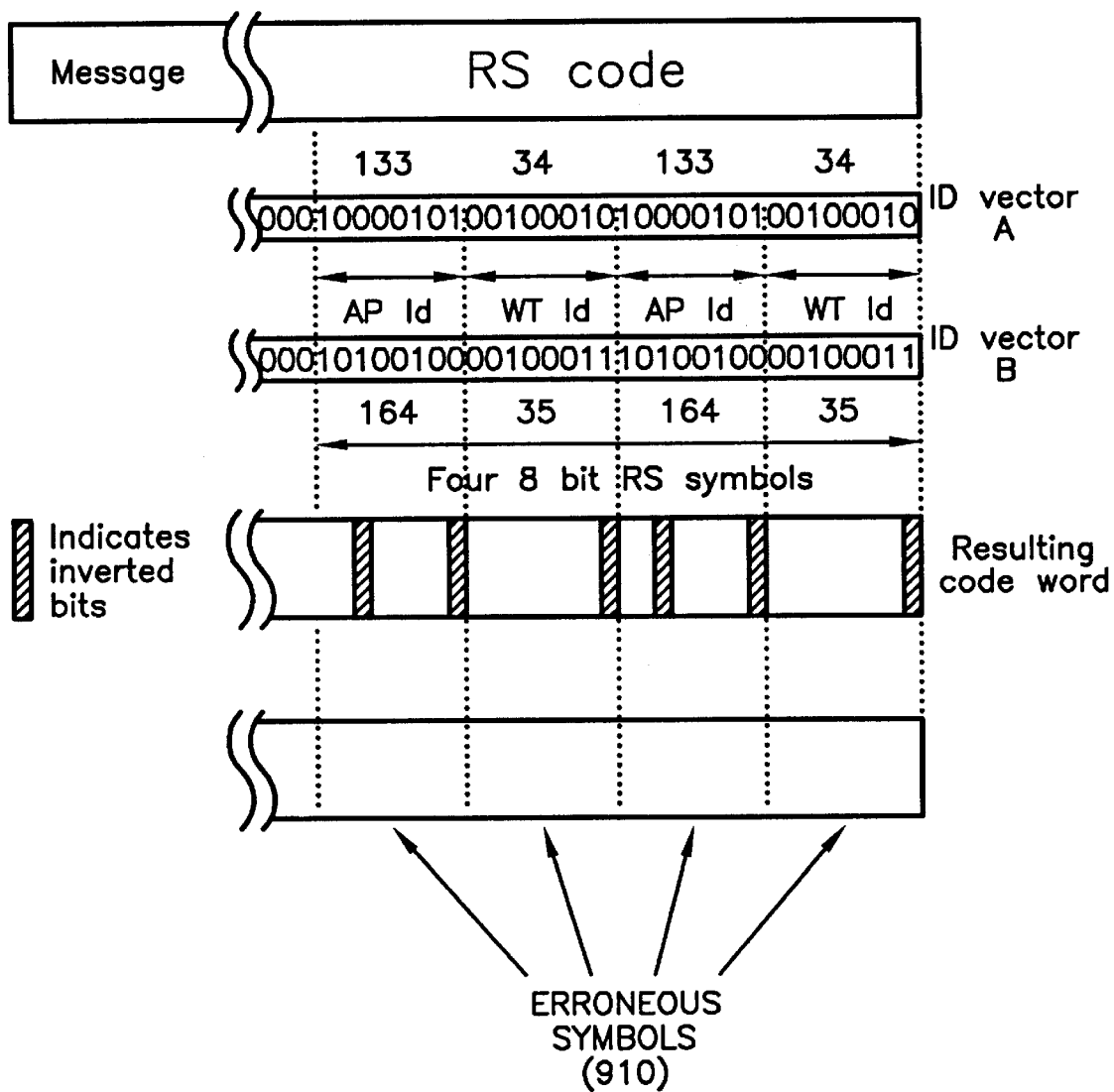
FIG. 9 illustrates another embodiment of the present invention involving the transportation of sender and receiver identifier information.

FIG. 9 illustrates an exemplary technique for accomplishing this alternative embodiment, wherein the errors induced by the XOR operation relate to the symbols of a Reed Solomon (RS) code 905, rather than a binary code, such as the CRC code illustrated in FIG. 3. However, one skilled in the art will readily appreciate that other error correction and/or error detection codes may be employed. In FIG. 9, it is assumed that the RS code 905 is designed to detect up to nine symbol errors and correct no more than one symbol error. Accordingly, the XOR operation must induce more than one symbol error. By employing two or more extended ID vectors A and B, as shown in FIG. 9, at least two symbol errors are induced in the resulting code word. Therefore, if an unintentional recipient receives this PDU, the erroneous symbol 910 cannot be miscorrected by the RS code, and the unintentional recipient is prevented from erroneously accepting the PDU.

It should also be noted that in the embodiment described above, ID vectors A and B are applied using an XOR operation. However, it will be understood that any unambiguous operation could be used in lieu of an XOR operation. For example, the ID vector A could be added to rather than XORed with the data/CRC vector 308. Then, at the receiver, ID vector B could be subtracted from the modified data/CRC vector 310.

The selection of a particular CRC technique is important. As previously stated, each CRC technique exhibits its own unique characteristics and capabilities. For example, one CRC technique may be capable of detecting burst errors which are no greater in length than the degree of the corresponding CRC generator polynomial. Alternatively, another CRC technique may be capable of detecting up to a certain number of single bit errors. The selection of a particular CRC technique is also important in that it directly affects the process of defining the various bit patterns (i.e., code combinations) for the ID vectors. That is because certain bit patterns will exploit the capabilities of the chosen CRC technique better than other bit patterns. Therefore, in choosing a particular CRC technique, it is imperative to consider whether it will be feasible to define an adequate number of ID vector bit patterns (i.e., code combinations) to uniquely identify the various access points and wireless terminals in the network, while at the same time, exploit the capabilities of the chosen CRC technique. It will be understood that error detection and error correction codes other than CRCs may be employed, for example, the RS code illustrated in FIG. 9.

Figure 5:
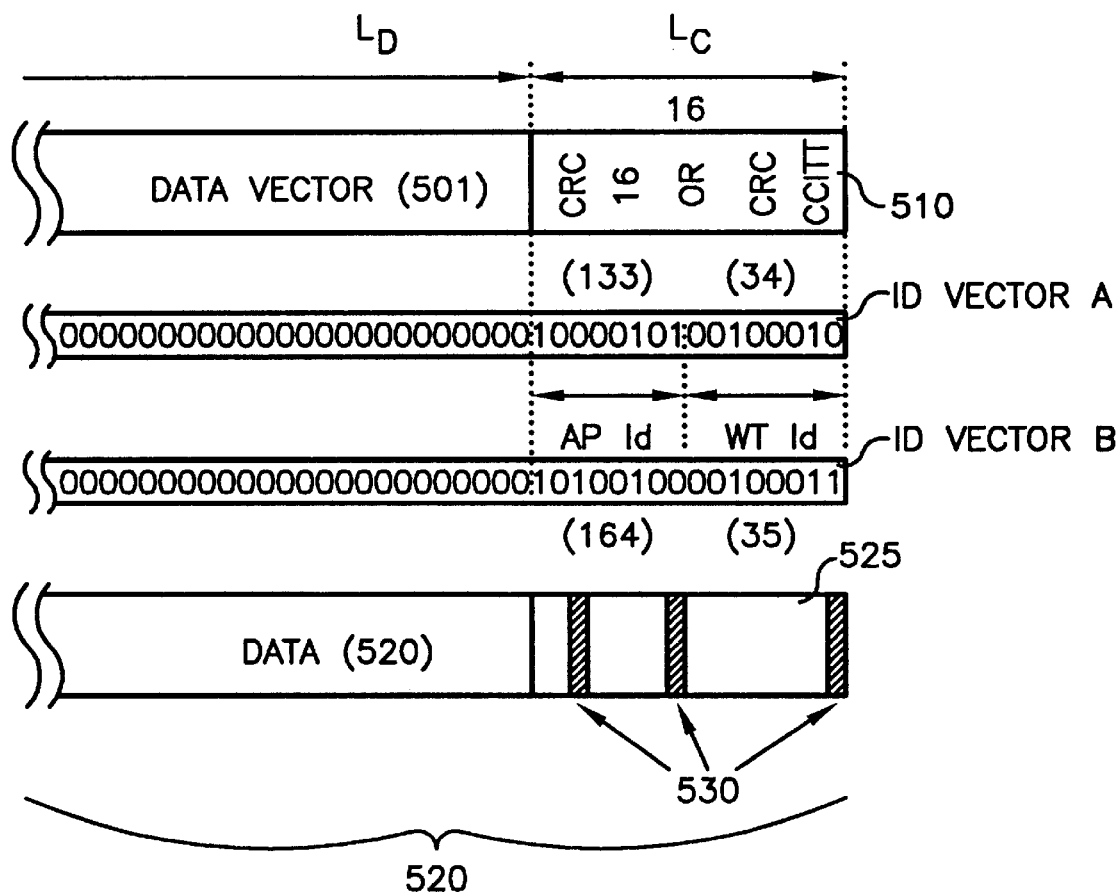
FIG. 5 illustrates a second embodiment of the present invention involving the transportation of sender and receiver identifier information.

In view of the discussion regarding the importance of selecting an appropriate CRC technique, an alternative embodiment will now be described herein below, wherein each ID vector A and each ID vector B comprise a sequence of zero bits, followed by an 8 bit AP ID, followed by an 8 bit WT ID. As illustrated in FIG. 5, the sequence of zero bits is aligned with, and equal in length to, the length $L_D$ of the data vector 501. The AP ID and the WT ID are located in hard-coded positions, and they are aligned with, and equal in length to, the CRC vector 510. As the combined length of the AP ID and the WT ID is 16 bits, a CRC technique that is capable of detecting all burst errors up to 16 bits in length would be appropriate. Accordingly, a CRC-16 or a CRC-CCITT (Consultative Committee on International Telegraphy and Telephony) has been chosen, as illustrated in FIG. 5. However, it will be understood, that had the combined length of the AP ID and the WT ID been greater than 16 bits, a different CRC technique would have been necessary, particularly one having a generator polynomial with a degree at least as large as the combined length of the AP ID and the WT ID. For example, had the combined length of the AP ID and the WT ID been 32 bits, in order to provide a sufficient number of code combinations for the various access points and wireless terminals in the network, a CRC technique such as a CRC-32 would have been more appropriate.

In accordance with the embodiment illustrated in FIG. 5, an XOR operation, or any of a number of other unambiguous operations, as explained above, between the ID vector A and the data/CRC vector 515 is accomplished. This results in a modified data/CRC vector (not shown), which is contained in the PDU transmitted to the receiver. At the receiver, an XOR operation between the ID vector B and the modified data/CRC vector is accomplished. This results in the generation of data/CRC vector 520. As in the previously described embodiment, the CRC generator polynomial, which is a generating function for the CRC vector 525, is divided into the data/CRC vector 520, using modulus-2 division. A zero remainder indicates that the receiver is the intended recipient of the PDU, whereas a non-zero remainder indicates either the presence of uncorrectable transmission errors or the fact that the receiver is not the intended recipient of the PDU.

In the specific example illustrated in FIG. 5, the sender is an access point with an AP ID of $133_{DECIMAL}$ and the intended receiver is a wireless terminal with a WT ID of $34_{DECIMAL}$. However, the actual receiver is not the intended receiver, as ID vector B clearly differs from ID vector A. More specifically, the actual receiver has a WT ID of $35_{DECIMAL}$, and it is associated with an access point that has an AP ID of $164_{DECIMAL}$. The utilization of an ID vector B at the receiving wireless terminal results in a number of inverted bits 530 in the CRC vector 525, as illustrated in FIG. 5. Accordingly, the modulus-2 division in this example should result in a non-zero remainder, and, as previously stated, the non-zero remainder equips the wireless terminal with the information necessary to determine that uncorrectable bit errors are present or that it is not the intended receiver. The wireless terminal can, therefore, discard the PDU.

In accordance with this alternative embodiment, each ID vector A and each ID vector B comprise a sequence of zero bits, an APID and a WT ID, as stated above. However, it will be understood, that nothing prohibits the alignment of the AP ID and the WT ID codes other than as shown in FIG. 5, as long as the bits associated with the APID and WT ID are surrounded by zeros.

In another exemplary embodiment, a CRC technique, other than a CRC-16 or a CRC-CCITT, that is capable of detecting up to and including 5 error constellations is employed. A CRC with a generator polynomial $g(x)=x^{16}+x^8+x^4+x^3+x^1+1$ could be used for this purpose. Of course, in defining the various bit patterns (i.e., the code combinations) for the ID vectors, it is imperative to insure that no combination can result in or give rise to more than 5 errors. Accordingly, three different approaches for defining the various ID vector bit patterns or code combinations are described herein below.

Figure 7A:
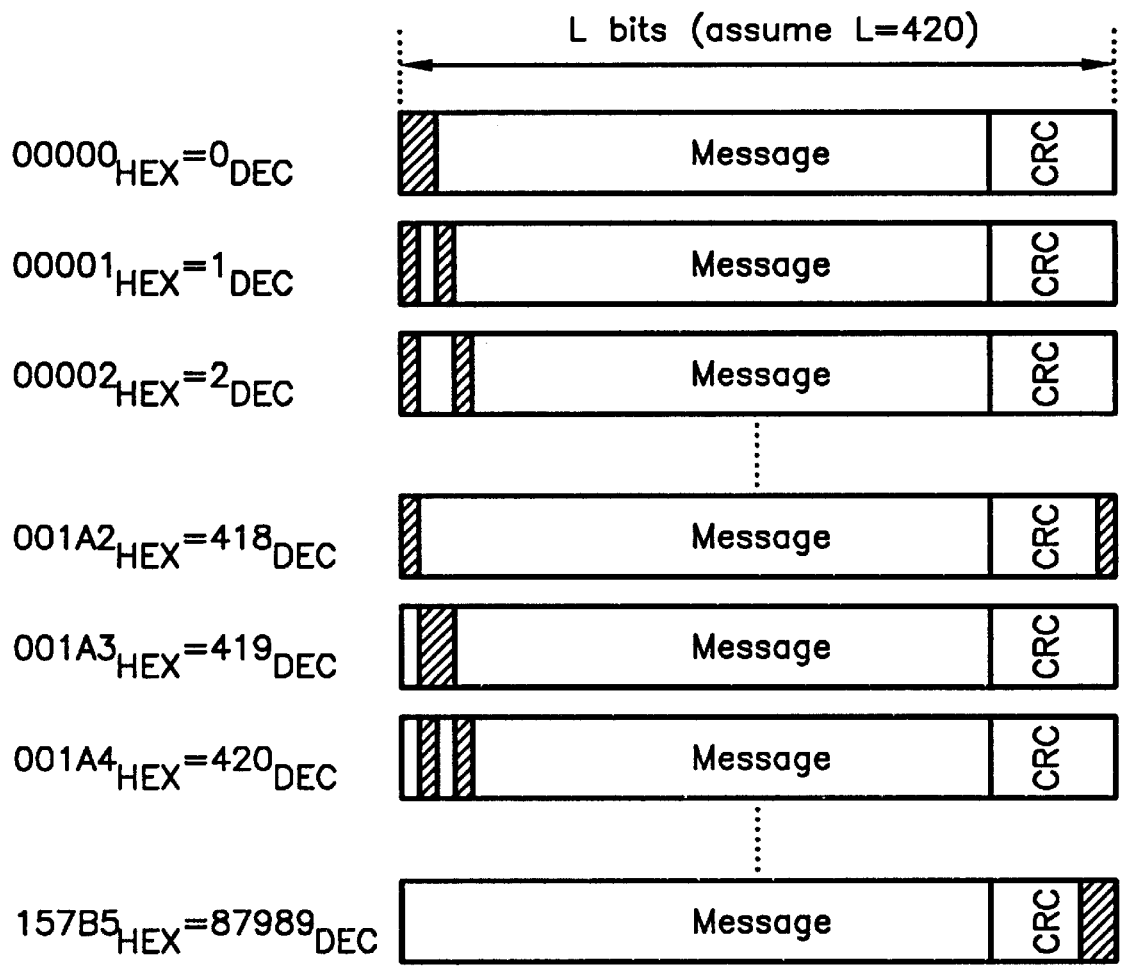
FIGS. 7A, 7B and 7C illustrate three different approaches for defining ID vector bit patterns that exploit the capabilities of a cyclic redundancy code (CRC) technique which can detect up to 5 errors.

In a first approach, each ID vector is L bits in length. The various ID vector bit patterns are then defined by different combinations of exactly two bits, as illustrated by ID vector bit patterns $0_{DEC}$ through $87,989_{DEC}$ in FIG. 7A. It is also illustrated in FIG. 7A that in accordance with this approach, 87,990 bit patterns or code combinations are possible when the length L of the ID vector is 420 bits. More importantly, however, the various ID vector bit patterns or code combinations defined using this approach can only give rise to either 0, 2 or 4 errors as a result of the XOR operations performed at the sender and the receiver. Therefore, the ID vectors defined in accordance with this approach can be used to exploit a CRC technique capable of detecting up to 5 errors.

Figure 7B:
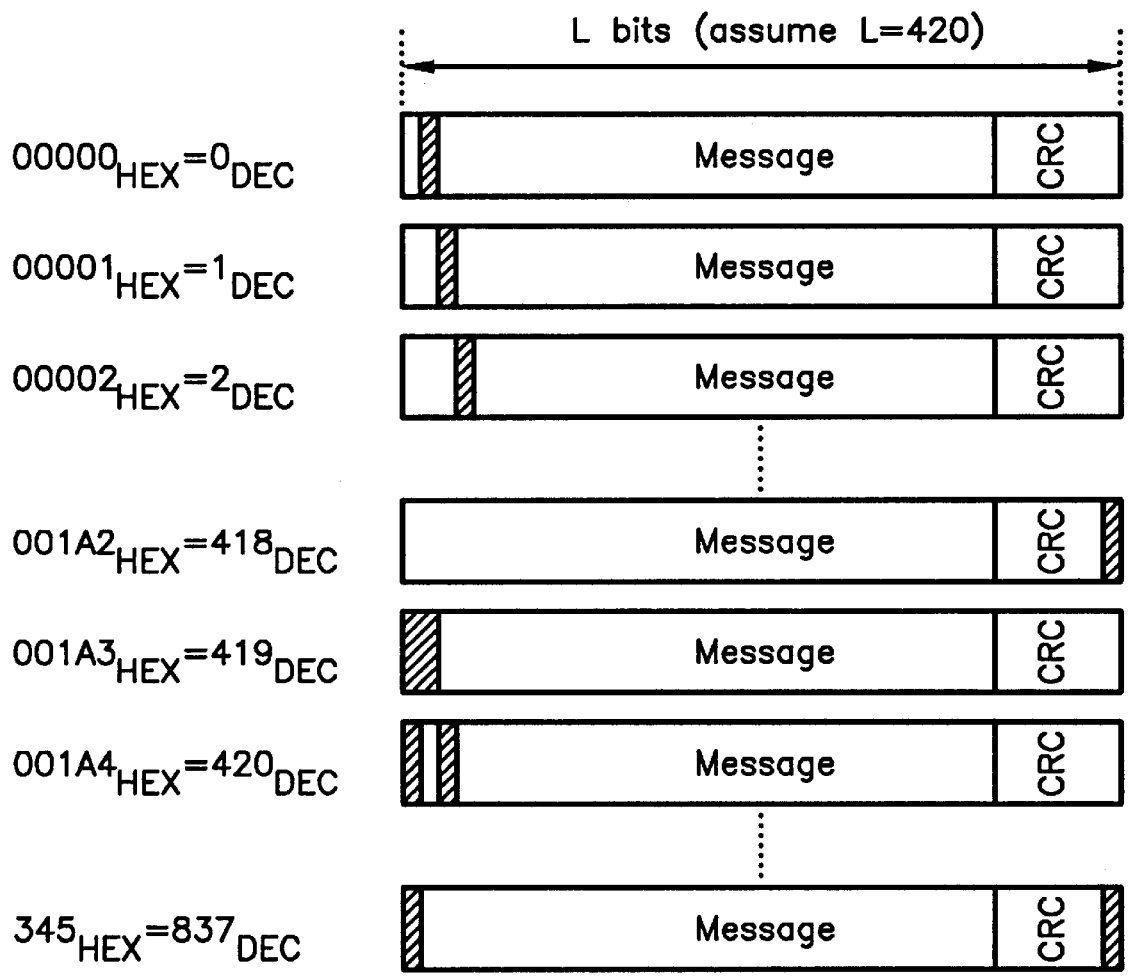
Figure 7B:

FIG. 7B illustrates a second approach for defining the various bit patterns for the ID vectors. In accordance with this second approach, the first bit position is set equal to "0" for one-half of the ID vector bit patterns, while only one of the remaining L-1 bit positions is set equal to "1", as illustrated in FIG. 7B by ID vector bit patterns $0_{DEC}$ through $418_{DEC}$. Further in accordance with this approach, the first bit position is set equal to "1" for the other half of the ID vector bit patterns, while only one of the remaining L-1 bit positions is set equal to "1", as illustrated by ID vector bit patterns $419_{DEC}$ through $837_{DEC}$. It will be understood that this second approach cannot support as many bit patterns (i.e., code combinations) as the first approach. However, it does provide a more straight-forward technique for mapping the various ID vector bit patterns. It will also be understood that the ID vector bit patterns defined in accordance with this approach, give rise to either 0, 1, 2 or 3 errors, as a result of the XOR operations performed at the sender and the receiver. Therefore, the ID vectors defined in accordance with this approach can be used to exploit a CRC technique capable of detecting up to 5 errors.

Figure 7C:
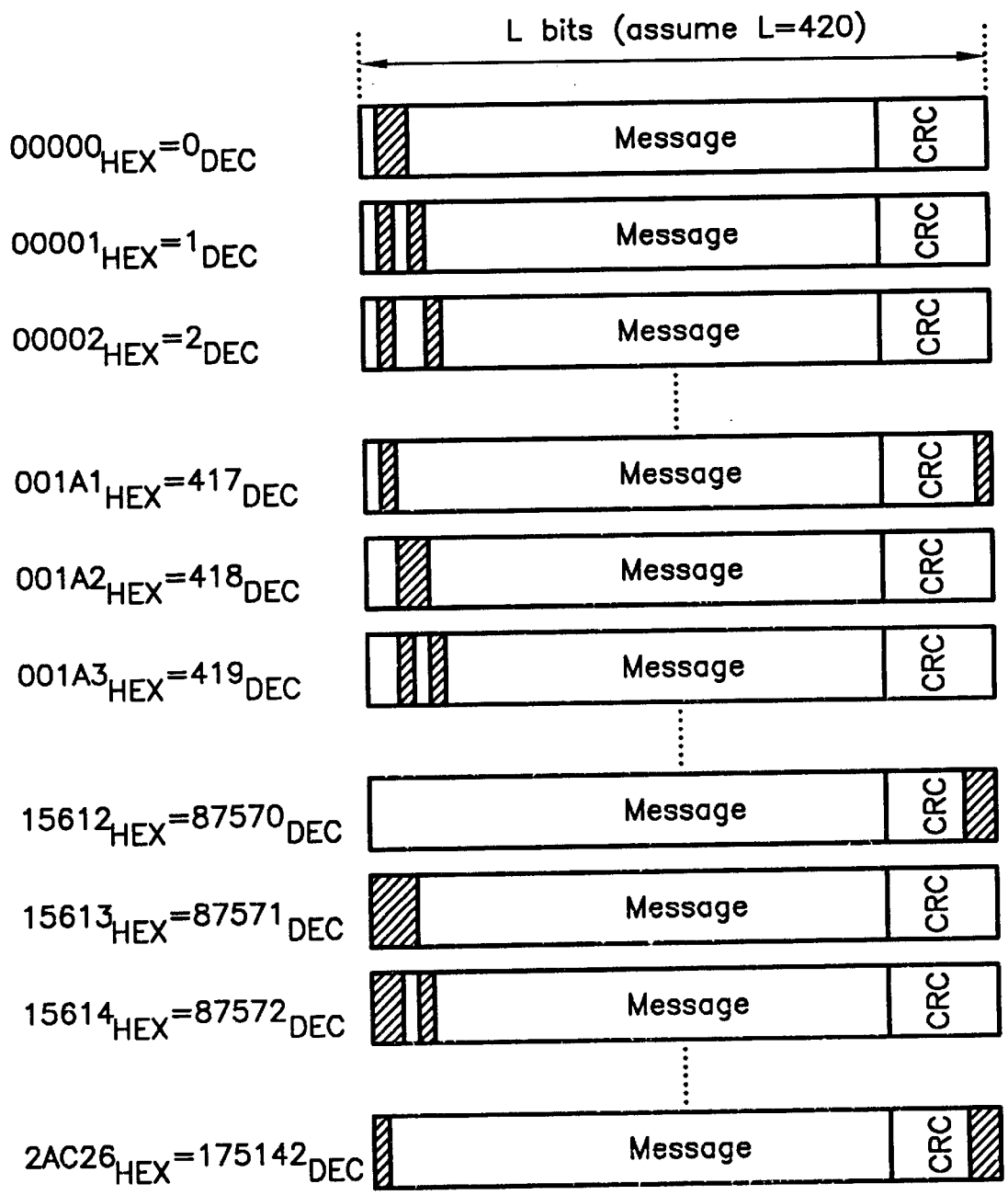
Figure 8A:
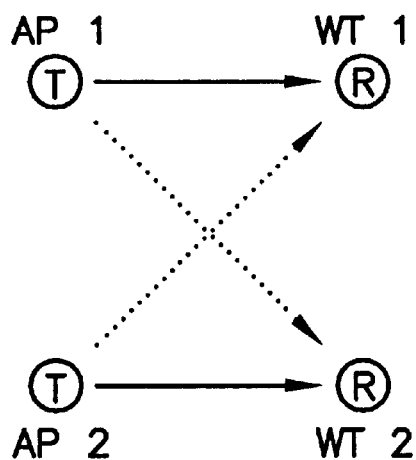
FIGS. 8A, 8B and 8C illustrate the concept of unintentional, cross-communication between access points and wireless terminals in a telecommunication network.
Figure 8B:
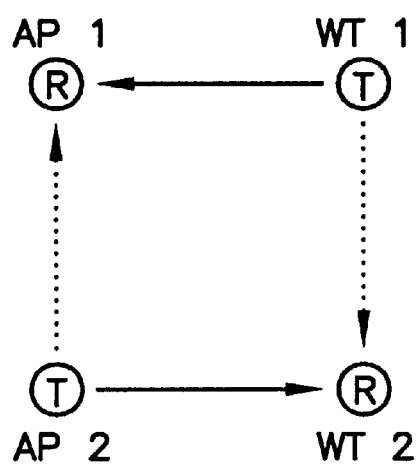
Figure 8C:
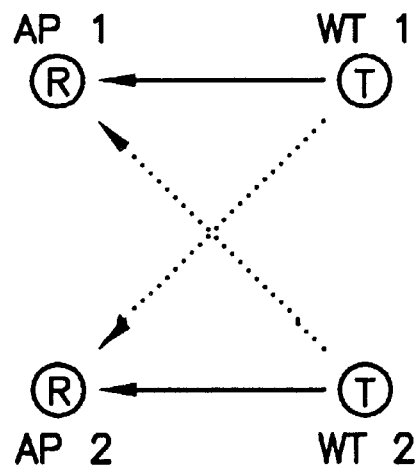

FIG. 7C illustrates a third approach for defining the various bit patterns for the ID vectors. The third approach is, in essence, a combination of the first and the second approaches described above. As illustrated in FIG. 7C, the first bit position of the ID vector bit pattern can be either "0" or "1", while exactly two of the remaining L-1 bit positions are set equal to "1". This approach yields 175,143 possible ID vector bit patterns, and it gives rise to either 0, 1, 2, 3, 4 or 5 errors as a result of the XOR operations at the sender and the receiver. Again, this approach also exploits the capabilities of a CRC technique which is capable of detecting up to 5 errors.

It will also be understood that the various ID vector bit patterns can be generated automatically through the execution of a dedicated algorithm. The ID vectors are then stored, for example, in a lookup table. The appropriate ID vector, that is the ID vector which contains the bit pattern corresponding to the sender and the intended receiver, can then be selected for each PDU from amongst the ID vectors in the lookup table.

Figure 6:
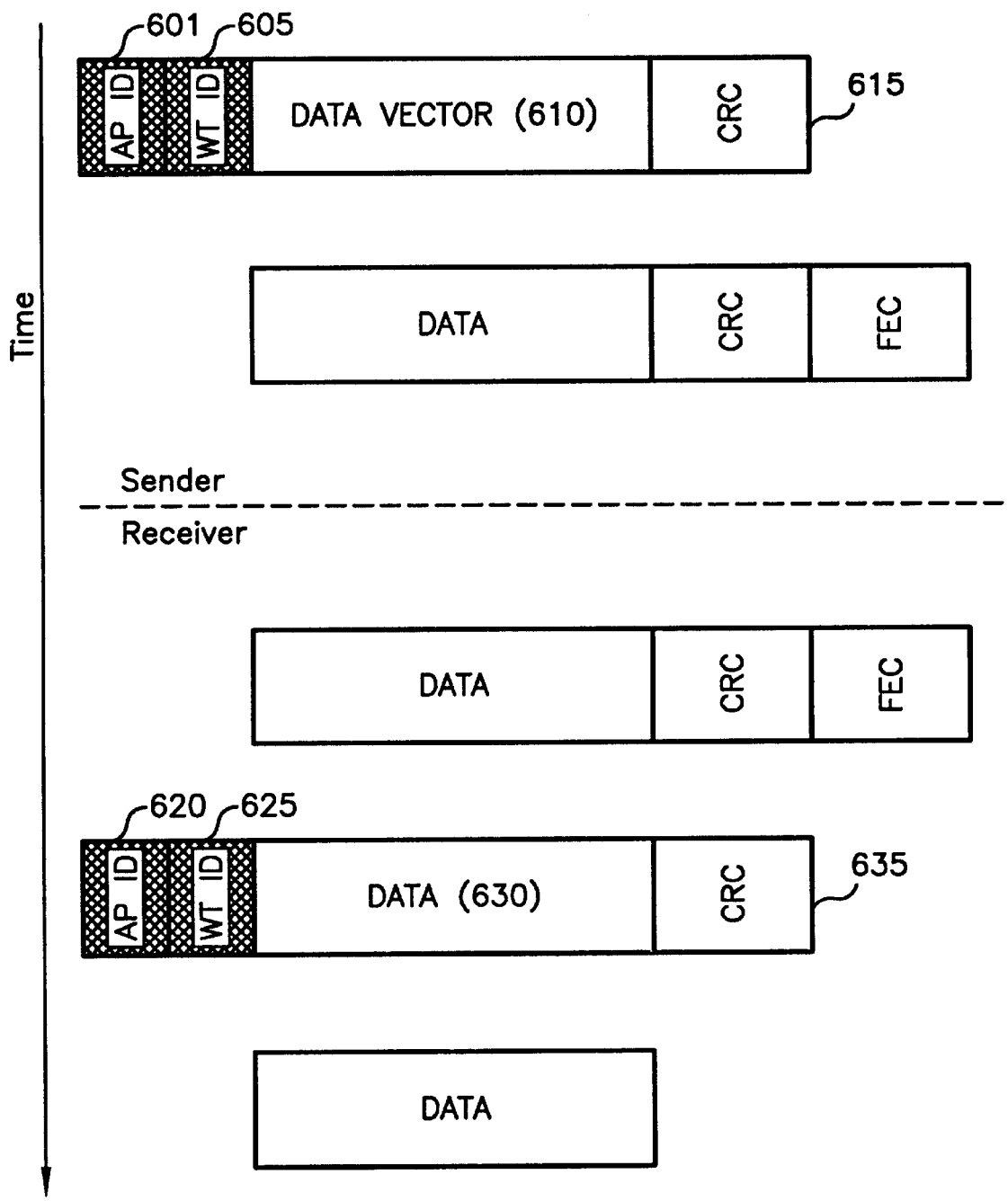
FIG. 6 illustrates a third embodiment of the present invention involving the transportation of sender and receiver identifier information.

Rather that applying the ID vector to the data word after the CRC has been accomplished, it is possible to apply the ID vector before the CRC is accomplished. Accordingly, FIG. 6 illustrates yet another exemplary embodiment of the present invention, wherein the AP ID 601 and/or the WT ID 605 is appended to the data vector 610. The AP ID 601, the WT ID 605 and the data vector 610 are then CRC encoded, and the resulting CRC vector 615 is appended to the data vector 610. The AP ID 601 and the WT ID 605 are then un-appended, and the data vector 610 and the CRC vector 615 are FEC encoded. In contrast with the embodiments described above, there is no need to perform an XOR operation. However, as in each of the previously described embodiments, the sender and receiver identifier information is transported from the sender to the receiver in each PDU without increasing the bandwidth requirements of the MAC protocol.

At the receiver, the expected AP ID 620 and the expected WT ID 625 are appended to the data vector 630. The receiver then modules-2 divides the codeword comprising APID 620, WT ID 625, data vector 630 and CRC vector 635 by the generator polynomial. As explained above, if the modulus-2 division results in a zero remainder, it is assumed that the receiver is the intended recipient of the PDU. Whereas, a non-zero remainder indicates that either there are uncorrectable bit errors present or the receiver is not the intended recipient of the PDU. In either case, the receiver is now armed with the knowledge to discard the PDU if necessary.

It will be understood that the location of the appended AP ID 601 and the WT ID 605 relative to the data vectors 610 and 630 is somewhat arbitrary. What is important is that the location is fixed and known to both the sender and the receiver.

Alternatively, it may, under certain instances, be beneficial to append and transmit one identifier code (e.g., the WT ID) and encode the other (e.g., the AP ID). For example, in the case of a RACH PDU, it may be beneficial to append and transmit with each PDU, the corresponding WT ID. Whereas, the AP ID is encoded in accordance with any of the previously described techniques. However, it will be understood that appending and transmitting, for example, the WT ID in each PDU increases the bandwidth requirement of the MAC protocol. The broadcast data field could, of course, be used to define the content of the identifier code being appended and/or encoded.

It should be noted that each of the embodiments described above supplement the CRC check that is typically performed by each wireless terminal on the broadcast field 205. For example, assume that the broadcast data field 205, transmitted from an access point to a particular wireless terminal associated with that access point, contains an error, which renders the information in the announcement list and/or the assignment list unreliable. If each of the DL LLC PDUs in the downlink data field 210 does not include WT ID information, in accordance with the above-described embodiments, there is no way the wireless terminal can determine which PDUs to receive and which PDUs to discard. Consequently, the wireless terminal is forced to discard the entire MAC frame. However, if each DL LLC PDU does contain the corresponding WT ID, the wireless terminal can assume the announcement list is correct, and then CRC check those DL LLC PDUs identified for that wireless terminal in the announcement list. Then, only the DL LLC PDUs that contain errors can be discarded without having to discard the entire MAC frame.

Of course, CRC checking each individual DL LLC PDU does not, per se, provide an indication as to whether the assignment list in the broadcast data field contains errors. Therefore, when a CRC check of the broadcast data field indicates the existence of errors, it is possible to establish a strategy, wherein the number of DL LLC PDU errors is utilized as an indicator of the probability that errors exist within the assignment list. For example, if the number of PDU errors exceeds a pre-determined number of errors, the uplink portion of the MAC frame can be discarded without discarding the entire downlink portion.

It will be further understood that the embodiments described above can be used to transport other types of a priori information from the sender to the receiver. For example, if in addition to the wireless terminal identifier codes, the announcement list incorporates virtual channel identifier (VCI) information associated with each ATM cell, it is possible to avoid explicitly including such information when transmitting the ATM cell in the DL LLC PDU. Instead, the VCI information can be XORed with or temporarily appended to the corresponding data vector. In another example, the ATM cell sequence number for a GO BACK N ARQ (Automatic Repeat Request) can be transported from the sender to the receiver without having to explicitly include the information in the DL LLC PDU. Of course, other data may be conveyed in a similar manner so long as the CRC can accommodate the additional combinations resulting from the inclusion of the additional information.

In still another embodiment of the present invention, an access point may purposely invert a unique combination of one or more bits in the CRC vector or the data vector of each DL LLC PDU. Upon receiving the DL LLC PDU, a wireless terminal associated with the access point knows to reinsert that same combination of bits before FEC and CRC decoding is accomplished. In contrast, the wireless terminals do not invert any bits in the CRC vector of each UL LLC PDU. This strategy prevents an access point from improperly decoding a DL LLC PDU and a wireless terminal from improperly decoding one or more UL LLC PDUs.

For example, in the unlikely event that a first wireless terminal having a WT ID of "3" (i.e., $WT_{A3}$), transmits an UL LLC PDU to a first access point with an AP ID of "14" (i.e., $AP_{A14}$), and a second wireless terminal with a WT ID of "3" (i.e., $WT_{B3}$), associated with a second access point having an AP ID of "14" (i.e., $AP_{B14}$), unintentionally receives the UL LLC PDU, this embodiment permits $WT_{B3}$ to distinguish the PDU as an UL LLC PDU, despite the similarity of the identifier code information, and hence discard the PDU appropriately.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of transporting a protocol data unit (PDU) from a sender to an intended receiver in a telecommunications network comprising the steps of:

at the sender, generating a PDU containing a data word;

encoding said data word as a function of a first identification vector without increasing the bandwidth required to transport said PDU from the sender to the receiver, wherein said first identification vector comprises a priori identification information relating to the sender and the intended receiver; and transmitting a data frame that includes said PDU from the sender to a plurality of receivers.

2. The method of claim 1, wherein said step of encoding said data word as a function of a first identification vector without increasing the bandwidth required to transport said PDU comprises the step of:

XORing said data word and said first identification vector.

3. The method of claim 1, wherein said data word comprises a user data vector and an error detection and correction code vector.

4. The method of claim 3, wherein said error detection and correction code vector is a cyclic redundancy code (CRC) vector, and wherein said method further comprises the steps of:

generating said CRC vector as a function of said user data vector; and generating said data word by appending said CRC vector to said user data vector.

5. The method of claim 4, wherein said first identification vector comprises a first portion and a second portion, said first portion containing said identification information relating to the sender and the intended receiver and said first portion being less than or equal in length to said CRC vector, said second portion containing a number of bits which are set equal to zero and said second portion being equal in length to said user data vector.

6. The method of claim 5, wherein said first portion contains a network address of the sender and the intended receiver.

7. The method of claim 3, wherein said error detection and error correction code is a Reed Solomon code vector.

8. The method of claim 1, wherein said identification information relating to the sender and the intended receiver comprises an address associated with the sender and an address associated with the intended receiver.

9. The method of claim 1, wherein said step of transmitting said data frame that includes said PDU from the sender to a plurality of receivers comprises the step of:
transmitting said data frame and said PDU in accordance with an asynchronous transfer mode (ATM) protocol.

10. The method of claim 9, wherein said identification information relating to the sender and the intended receiver comprises a connection identifier code.

11. The method of claim 9, wherein said identification information relating to the sender and the intended receiver comprises a packet sequence number.

12. The method of claim 1 further comprising the steps of:
at a receiver, decoding said encoded data word as a function of a second identification vector; wherein said second identification vector comprises identification information relating to the receiver and an expected sender;
verifying the integrity of said decoded data word as a function of said user data vector and said CRC vector; and
determining whether the receiver is the intended receiver of the PDU based on the result of the decoded data word integrity verification.

13. The method of claim 12, wherein said step of decoding said encoded data word as a function of said second identification vector comprises the step of:
XORing said encoded data word with said second identification vector.

14. The method of claim 12, wherein said first and said second identification vectors are defined such that the step of encoding said data word as a function of said first identification vector and said step of decoding said encoded data word as a function of said second identification vector do not induce in said decoded data word a number of bit errors which exceeds a number of errors that can be detected during said step of verifying the integrity of said decoded data word as a function of said user data vector and said CRC vector.

15. The method of claim 14, wherein said first and said second identification vectors comprise a sequence of bits having a length L, wherein the length L is equal to the length of said data word, and wherein exactly two bit positions are set equal to "1" and the remaining L-2 bit positions are set equal to "0".

16. The method of claim 14, wherein said first and said second identification vectors comprise a sequence of bits having a length L, wherein the length L is equal to the length of said data word, and wherein a first bit position is set equal to either "1" or "0" and exactly one of the remaining L-1 bit positions is set equal to "1".

17. The method of claim 14, wherein said first and said second identification vectors comprise a sequence of bits having a length L, wherein the length L is equal to the length of said data word, and wherein a first bit position is set equal to either "1" or "0" and exactly two of the remaining L-1 bit positions are set equal to "1".

18. The method of claim 1 further comprising the step of:
selecting said first identifier code as a function of said identification information relating to the sender and the intended receiver, from amongst a plurality of identifier codes stored in a lookup table, wherein said plurality of identifier codes were generated by an algorithm.

19. The method of claim 1, wherein said data frame comprises a broadcast data field and a plurality of PDUs, and wherein said broadcast data field includes a list of the plurality of PDUs and information relating to the intended receiver of each of said plurality of PDUs.

20. The method of claim 19 further comprising the steps of:
at a receiver, decoding the data words associated with each of said plurality of PDUs as a function of each of a plurality of second identification vectors which are derived from said list in said broadcast data field and the information relating to the intended receiver of each of said plurality of PDUs;
verifying the integrity of said decoded data words as a function of the user data vectors and CRC vectors associated with each data word; and
verifying the integrity of said broadcast data field based on the data integrity verification of said decoded data words.

21. The method of claim 20, wherein said step of verifying the integrity of said broadcast data field comprises the step of:
comparing a number of PDUs which fail the integrity verification with a predefined number of PDU integrity verification failures.

22. A method for determining whether a receiver is an intended receiver of a protocol data unit (PDU) transmitted to the receiver from a sender in a telecommunications network, said method comprising the steps of:
receiving said PDU, wherein said PDU comprises a user data vector and a cyclic redundancy code (CRC) vector, and wherein said user data vector and said CRC vector have been modified at the sender, without increasing the bandwidth required to transmit the PDU from the sender to the intended receiver, as a function of a first identification vector which contains identification information relating to the sender and the intended receiver;
re-modifying said user data vector and said CRC vector as a function of a second identification vector which contains identification information relating to the receiver and an expected sender;
verifying the integrity of said PDU as a function of said re-modified user data vector and said re-modified CRC vector; and
determining whether the receiver is the intended receiver based on the result of the PDU integrity verification.

23. The method of claim 22, wherein said step of verifying the integrity of said PDU as a function of the intended receiver comprises the step of:
dividing a CRC generator polynomial into said re-modified user data vector using modulus-2 division.

24. The method of claim 23, wherein said step of determining whether the receiver is the intended receiver comprises the steps of:
determining whether the modulus-2 division resulted in a zero remainder; and
if the modulus-2 division did result in a zero remainder, determining that the receiver is the intended receiver.

25. The method of claim 24, wherein said first and said second identification vectors are equivalent if the receiver is the intended receiver.

26. The method of claim 23, wherein said step of determining whether the receiver is the intended receiver comprises the steps of:
- determining whether the modulus-2 division resulted in a non-zero remainder; and
- if the modulus-2 division did result in a non-zero remainder, determining that the receiver is not the intended receiver.

27. The method of claim 26 further comprising said step of:
- discarding said PDU if it is determined that the receiver is not the intended receiver.

28. A method of transporting a protocol data unit (PDU) from a sender to an intended receiver in a telecommunications network, wherein said PDU contains a user data vector, said method comprising the steps of:
- appending a first identification vector to said user data vector;
- generating a cyclic redundancy code (CRC) vector based on said user data vector and said appended, first identification vector;
- appending said CRC vector to said user data vector;
- removing said appended, first identification vector from said user data vector; and
- transmitting said PDU, including said user data vector and said appended CRC vector.

29. The method of claim 28, wherein said first identification vector comprises a network address.

30. The method of claim 29 further comprising the step of:
- generating control data to be transmitted prior to said PDU, wherein said control data defines said network address.

31. The method of claim 30, wherein said control data defines said network address is an access point identifier code.

32. The method of claim 30, wherein said control data defines said network address is a wireless terminal identifier code.

33. The method of claim 30, wherein said control data defines said network address is an access point identifier code and a wireless terminal identifier code.

34. The method of claim 28 further comprising the steps of:
- at a receiver, appending a second identification vector to said user data vector;
- generating a CRC generator polynomial from said CRC vector;
- verifying the integrity of said PDU by dividing said CRC generator polynomial into said user data vector and said appended, second identification vector; and
- determining whether the receiver is the intended receiver based on the result of the PDU integrity verification.

35. In a telecommunications network, a method of determining whether a receiver is an intended receiver of a protocol data unit (PDU) transmitted from a sender, wherein said PDU comprises a user data vector and a cyclic redundancy code (CRC) vector, and wherein said CRC vector was derived at the sender as a function of said user data vector and a first identification vector that was appended to said user data vector only for the purpose of deriving said CRC vector, said method comprising the steps of:
- at the receiver, generating a CRC generator polynomial based on said CRC vector;
- appending a second identification vector to said user data vector;
- dividing said CRC generator polynomial into a data word comprising said user data vector and said appended, second identification vector;
- determining whether the receiver is the intended receiver based on the result of the division.

36. The method of claim 35, wherein said step of dividing said CRC generator polynomial into the data word involves modulus-2 division.

37. The method of claim 35, wherein said step of determining whether the receiver is the intended receiver comprises the step of:
- determining whether the division resulted in a zero remainder; and
- if the division did result in a zero remainder, determining that the receiver is the intended receiver.

38. The method of claim 35, wherein said step of determining whether the receiver is the intended receiver comprises the step of:
- determining whether the division resulted in a non-zero remainder; and
- if the division did result in a non-zero remainder, determining that the receiver is not the intended receiver.

39. The method of claim 38 further comprising said step of:
- discarding said PDU if it is determined that the receiver is not the intended receiver.

* * * * *